(12) United States Patent
Miki et al.

(10) Patent No.: US 7,522,206 B2
(45) Date of Patent: Apr. 21, 2009

(54) PHOTOGRAPHED IMAGE DISPLAY DEVICE AND PHOTOGRAPHED IMAGE DISPLAY METHOD

(75) Inventors: Yasuhiro Miki, Higashiosaka (JP); Hajime Kanki, Nishinomiya (JP)

(73) Assignee: Kyocera Corporation, Fushimi-ku, Kyoto (JP)

( * ) Notice: Subject to any disclaimer, the term of this patent is extended or adjusted under 35 U.S.C. 154(b) by 381 days.

(21) Appl. No.: 10/507,043

(22) PCT Filed: Feb. 24, 2003

(86) PCT No.: PCT/JP03/01968

§ 371 (c)(1),
(2), (4) Date: May 25, 2005

(87) PCT Pub. No.: WO03/077535

PCT Pub. Date: Sep. 18, 2003

(65) Prior Publication Data

US 2005/0225651 A1    Oct. 13, 2005

(30) Foreign Application Priority Data

Mar. 14, 2002  (JP) .............................. 2002-070981

(51) Int. Cl.
*H04N 5/222*  (2006.01)
*H04M 1/00*  (2006.01)
(52) U.S. Cl. ............................... 348/333.01; 455/556.1
(58) Field of Classification Search ................. 345/1.2, 345/1.3, 2.2, 3.1; 348/207.2, 143, 14, 231.6, 348/333.01
See application file for complete search history.

(56) References Cited

U.S. PATENT DOCUMENTS

| 6,400,374 | B2 * | 6/2002 | Lanier ......................... 345/630 |
| 6,628,333 | B1 * | 9/2003 | Gowda et al. .......... 348/333.11 |
| 2001/0055983 | A1 * | 12/2001 | Ohmura et al. ............. 455/566 |
| 2002/0149678 | A1 * | 10/2002 | Shiki et al. ................ 348/207.2 |

FOREIGN PATENT DOCUMENTS

| EP | 0898405 A2 | 8/1998 |
| JP | 11313238 A | 9/1999 |
| JP | 2000-134513 A | 12/2000 |
| JP | 2001-1306051 A | 2/2001 |
| JP | 2001-306051 | 11/2001 |

* cited by examiner

*Primary Examiner*—Tuan V Ho
*Assistant Examiner*—Tuan H Le

(57) ABSTRACT

A photographed image display device (200) includes an LCD module (230). The LCD module (230) includes a graphic memory (231) operable to store image data and an LCD (232) operable to display an image based on the image data stored in the graphic memory. The photographed image display device (200) includes a photographing unit (210) operable to output image data of an object sequentially, and a storing unit (260) operable to store image data. Here, the sequentially output image data is transferred to the graphic memory (231). When receiving a storage instruction for the image data, the photographed image display device (200) judges whether the transfer of the image data to the graphic memory (231) has been completed. When the transfer has been completed, the photographed image display device (200) reads the image data from the graphic memory (231) and store the read image data to the storing unit (260).

12 Claims, 10 Drawing Sheets

PHOTOGRAPHED IMAGE DISPLAY DEVICE AND PHOTOGRAPHED IMAGE DISPLAY METHOD

TECHNICAL FIELD

The present invention relates to a photographed image display device and a photographed image display method which are used, for example, in digital cameras and mobile telephones with an image display function.

BACKGROUND ART

In recent years, various types of photographed image display devices using a semiconductor photodetector such as a Charge Coupled Device (CCD) for converting light into electrical signals have rapidly become widespread. Such photographed image display devices include digital cameras, and mobile communications terminals such as mobile telephones and Personal Digital Assistants (PDAs) equipped with a digital camera.

FIG. 9 is a functional block diagram illustrating an example construction of a conventional photographed image display device 100.

The photographed image display device 100 is constituted by a camera unit 110, a frame memory 120, a liquid crystal display (LCD) module 130, a CPU 140, an operation unit 150, a storage unit 160, and an Application Specific Integrated Circuit (ASIC) 170.

The camera unit 110 photographs an object, and sequentially outputs image data obtained by the photographing (hereinafter referred to as photographed image data) to the ASIC 170.

Here, "to photograph an object" represents a process of forming an image of the object on the light-receiving surface of a semiconductor photodetector through a lens of a camera and converting the formed image into image data.

The frame memory 120 temporarily stores photographed image data transferred from the ASIC 170.

The LCD module 130 includes a graphic Random Access Memory (GRAM) 131, and an LCD 132. Photographed image data input to the LCD module 130 from the ASIC 170 is displayed on the LCD 132.

The GRAM 131 temporarily stores photographed image data input from the ASIC 170.

The LCD 132 displays the photographed image data.

The CPU 140 receives a user's instruction input through the operation unit 150, and issues an instruction corresponding to the user's instruction to an appropriate constituent. For example, when receiving a photographing start instruction from a user, the CPU 140 instructs the ASIC 170 to execute a photographing operation. When receiving a photographed image storage instruction, the CPU 140 reads the photographed image data stored in the frame memory 120, and stores the photographed image data in the storage unit 160.

The operation unit 150 generates a corresponding instruction signal, when receiving the user's instruction, and outputs the generated instruction signal to the CPU 140.

The storage unit 160 stores photographed image data input by the CPU 140.

The ASIC 170 controls the photographing operation in the following manner. When the CPU 140 instructs the ASIC 170 to execute the photographing operation, the ASIC 170 receives photographed image data output from the camera unit 110. The ASIC 170 performs image processing (e.g. color correction) on the photographed image data, and then transfers the photographed image data to the frame memory 120. Furthermore, the ASIC 170 reads the photographed image data from the frame memory 120 to output the photographed image data to the LCD module 130.

Thus, the user of this photographed image display device 100 can photograph an image of a desired object, and store the photographed image.

As described above, the conventional photographed image display device 100 requires the frame memory 120 as a buffer memory, to enable photographed image data to be retrieved as needed in response to the photographed image storage instruction from the user.

DISCLOSURE OF THE INVENTION

However, miniaturization and cost reduction have been rapidly proceeding in the technical field of mobile communications terminals such as mobile telephones. This has created a demand for further miniaturization and cost reduction by discarding a frame memory.

To satisfy this demand, it is an object of the present invention to provide a photographed image display device and a photographed image display method which have a simpler structure than in the related art, and does not require a frame memory.

The object can be achieved by a photographed image display device including: an LCD module including a graphic memory operable to store image data and an LCD operable to display an image based on the image data stored in the graphic memory; a camera operable to form an optical image of an object, convert the formed optical image into image data, and output the image data sequentially; a transfer unit operable to receive the image data output from the camera and transfer the image data to the graphic memory; a storage medium operable to store image data; a storage instruction receiving unit operable to receive a storage instruction to store the image data into the storage medium; a judging unit operable to judge whether the transfer of the image data from the transfer unit to the graphic memory has been completed; and a storing unit operable to, when the transfer has been completed, read the image data from the graphic memory according to the storage instruction, and store the read image data into the storage medium.

Here, the above object can be also achieved by a photographed image display method for a photographed image display device including (i) an LCD module including a graphic memory for storing image data and an LCD for displaying an image based on the image data stored in the graphic memory and (ii) a storage medium for storing image data. The photographed image display method includes: a photographing step of forming an optical image of an object, converting the formed optical image into image data, and outputting the image data sequentially; a transfer step of receiving the image data output in the photographing step and transferring the image data to the graphic memory; a storage instruction receiving step of receiving a storage instruction to store the image data into the storage medium; a judging step of judging whether the transfer of the image data to the graphic memory has been completed; and a storing step of, when the transfer has been completed, reading the image data from the graphic memory according to the storage instruction, and storing the read image data into the storage medium.

Here, the above object can be also achieved by a mobile telephone including a photographed image display device. The photographed image display device includes: an LCD module including a graphic memory operable to store image data and an LCD operable to display an image based on the image data stored in the graphic memory; a camera operable to form an optical image of an object, convert the formed optical image into image data, and output the image data sequentially; a transfer unit operable to receive the image data output from the camera and transfer the image data to the graphic memory; a storage medium operable to store image data; a storage instruction receiving unit operable to receive a storage instruction to store the image data into the storage medium; a judging unit operable to judge whether the transfer of the image data from the transfer unit to the graphic memory has been completed; and a storing unit operable to, when the transfer has been completed, read the image data from the graphic memory according to the storage instruction, and store the read image data into the storage medium.

Here, the above object can be also achieved by a photographed image display program used for a photographed image display device including (i) an LCD module having a graphic memory for storing image data and an LCD for displaying an image based on the image data stored in the graphic memory and (ii) a storage medium for storing image data. The photographed image display program includes: a photographing step of forming an optical image of an object, converting the formed optical image into image data, and outputting the image data sequentially; a transfer step of receiving the image data output in the photographing step and transferring the image data to the graphic memory; a storage instruction receiving step of receiving a storage instruction to store the image data into the storage medium; a judging step of judging whether the transfer of the image data to the graphic memory has been completed; and a storing step of, when the transfer has been completed, reading the image data from the graphic memory according to the storage instruction, and storing the read image data into the storage medium.

In this way, the image data obtained by photographing the object (i.e. photographed image data) is retrieved directly from the graphic memory in the LCD module in response to a storage instruction from a user, to be stored in the storing medium. Therefore, the photographed image data can be stored in the storing medium, without using a buffer memory such as a frame memory for storing photographed image data. As a result, the photographed image display device can have a simpler construction than in the related art.

Here, the above object is also achieved by a photographed image display device including: a first LCD module and a second LCD module which each include a graphic memory operable to store image data and an LCD operable to display an image based on the image data stored in the graphic memory; a camera operable to form an optical image of an object, convert the formed optical image into image data, and output the image data sequentially; a first transfer unit operable to receive the image data output from the camera and transfer the image data to the graphic memory in the first LCD module; a storage medium prestoring frame image data; a judging unit operable to judge whether the transfer of the image data from the first transfer unit to the graphic memory in the first LCD module has been completed; and a second transfer unit operable to, when the transfer has been completed, read the image data from the graphic memory in the first LCD module, combine the read image data and the frame image data so as to generate composite image data, and transfer the composite image data to the graphic memory in the second LCD module.

Here, the above object can be also achieved by a photographed image display method for a photographed image display device including (i) a first LCD module and a second LCD module each including a graphic memory for temporarily storing image data and an LCD for displaying the image data, and (ii) a storage medium prestoring frame image data. The photographed image display method includes: a photographing step of forming an optical image of an object, converting the formed optical image into image data, and outputting the image data sequentially; a first transfer step of receiving the image data output in the photographing step and transferring the image data to the graphic memory in the first LCD module; a judging step of judging whether the transfer of the image data to the graphic memory in the first LCD module has been completed; and a second transfer step of, when the transfer has been completed, reading the image data from the graphic memory in the first LCD module, combining the read image data and the frame image data so as to generate composite image data, and transferring the composite image data to the graphic memory in the second LCD module.

Here, the above object can be also achieved by a mobile telephone including a photographed image display device. The photographed image display device includes: a first LCD module and a second LCD module which each include a graphic memory operable to store image data and an LCD operable to display an image based on the image data stored in the graphic memory; a camera operable to form an optical image of an object, convert the formed optical image into image data, and output the image data sequentially; a first transfer unit operable to receive the image data output from the camera and transfer the image data to the graphic memory in the first LCD module; a storage medium prestoring frame image data; a judging unit operable to judge whether the transfer of the image data from the first transfer unit to the graphic memory in the first LCD module has been completed; and a second transfer unit operable to, when the transfer has been completed, read the image data from the graphic memory in the first LCD module, combine the read image data and the frame image data so as to generate composite image data, and transfer the composite image data to the graphic memory in the second LCD module.

Here, the above object can be also achieved by a photographed image display program used for a photographed image display device including (i) a first LCD module and a second LCD module each having a graphic memory for temporarily storing image data and an LCD for displaying the image data, and (ii) a storage medium prestoring frame image data. The photographed image display program includes: a photographing step of forming an optical image of an object, converting the formed optical image into image data, and outputting the image data sequentially; a first transfer step of receiving the image data output in the photographing step and transferring the image data to the graphic memory in the first LCD module; a judging step of judging whether the transfer of the image data to the graphic memory in the first LCD module has been completed; and a second transfer step of, when the transfer has been completed, reading the image data from the graphic memory in the first LCD module, combining the read image data and the frame image data so as to generate composite image data, and transferring the composite image data to the graphic memory in the second LCD module.

In this way, the image data obtained by photographing the object (i.e. photographed image data) can be retrieved from the graphic memory in the first LCD module. The composite image data is generated by combining the retrieved image data and the frame image data stored in the storage medium. The composite image data is transferred to the graphic memory in the second LCD module, so as to be displayed on the LCD in the second LCD module. As a consequence, a composite image for the photographed object can be displayed on the LCD without using a buffer memory.

Here, the above object can be also achieved by a photographed image display device including: a first LCD module and a second LCD module which each include a graphic memory operable to store image data and an LCD operable to display an image based on the image data stored in the graphic memory; a camera operable to form an optical image of an object, convert the formed optical image into image data, and output the image data sequentially; a first transfer unit operable to receive the image data output from the camera and transfer the image data to the graphic memory in the first LCD module; a storage medium prestoring frame image data; a judging unit operable to judge whether the transfer of the image data from the first transfer unit to the graphic memory in the first LCD module has been completed; second transfer unit operable to, when the transfer has been completed, read the image data from the graphic memory in the first LCD module, combine the read image data and the frame image data so as to generate composite image data, and transfer the composite image data to the graphic memory in the second LCD module; a storage instruction receiving unit operable to receive a storage instruction to store the composite image data into the storage medium; and a storing unit operable to store the composite image data into the storage medium according to the storage instruction.

In this way, a composite image for the photographed object can be stored.

BEST MODE FOR CARRYING OUT THE INVENTION

First Embodiment

According to a first embodiment, a photographed image display device includes: an LCD module including a graphic memory operable to store image data and an LCD operable to display an image based on the image data stored in the graphic memory; a camera operable to form an optical image of an object, convert the formed optical image into image data, and output the image data sequentially; and a storage medium operable to store image data. The image data sequentially output from the camera is transferred to the graphic memory. When receiving a storage instruction to store the image data into the storage medium, the photographed image display device judges whether the transfer of the image data to the graphic memory has been completed. When the transfer has been completed, the photographed image display device reads the image data from the graphic memory, and stores the read image data into the storage medium.

(Construction)

Figure 1:
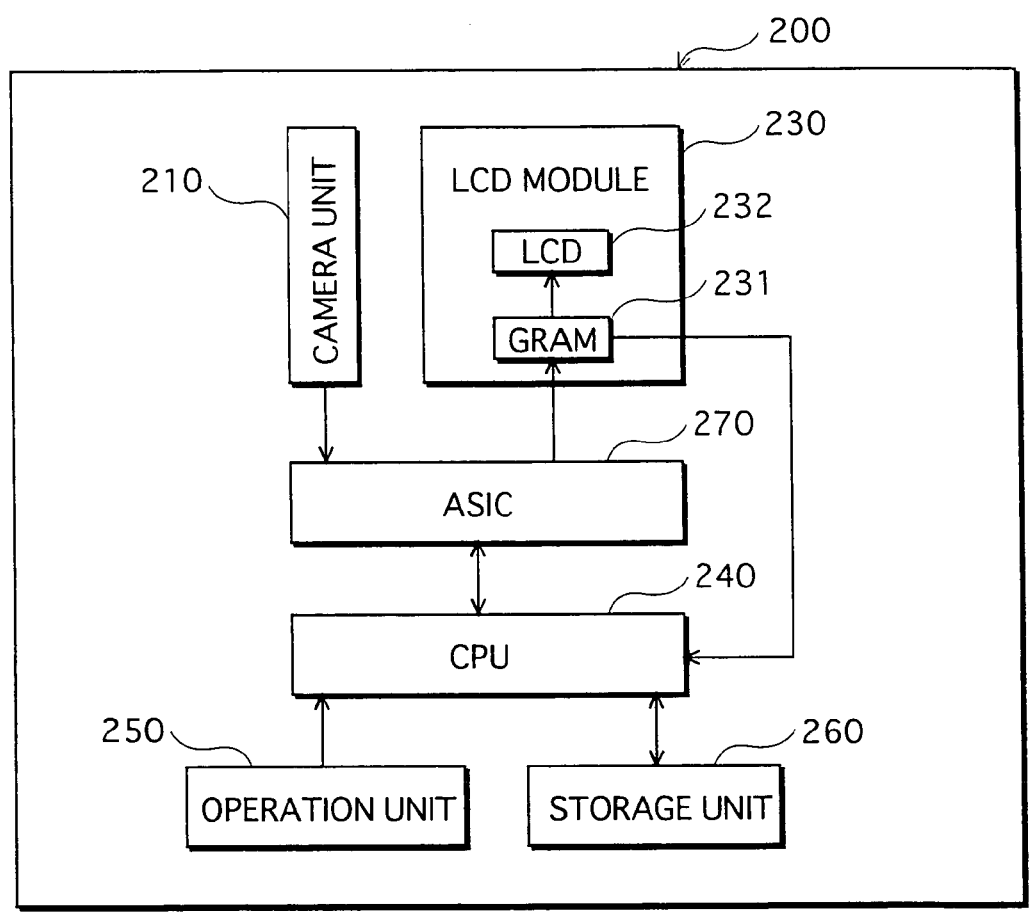
FIG. 1 is a functional block diagram illustrating a construction of a photographed image display device 200 relating to a first embodiment.

FIG. 1 illustrates a construction of a photographed image display device 200 relating to the first embodiment. The photographed image display device 200 is constituted by a camera unit 210, an LCD module 230, a CPU 240, an operation unit 250, a storage unit 260, and an ASIC 270.

The camera unit 210 includes a camera such as a CCD camera and a complementary metal oxide semiconductor (CMOS) camera. The camera unit 210 cyclically repeats the following operations (1) to (4).

(1) Photograph an object (2) Output photographed image data to the ASIC 270 sequentially (3) At the start of outputting photographed image data to the ASIC 270, issue an output start signal to the ASIC 270 to inform the start of the outputting (4) At the end of outputting the photographed image data, issue an output end signal to the ASIC 270

The LCD module 230 includes a GRAM 231 and an LCD 232. The LCD module 230 displays a photographed image on the LCD 232 based on photographed image data transferred from the ASIC 270.

The GRAM 231 temporarily stores photographed image data that is transferred from the ASIC 270. When the GRAM 231 receives new photographed image data from the ASIC 270, photographed image data that has been stored in the GRAM 231 is overwritten with the new photographed image data.

The LCD 232 displays a photographed image based on photographed image data stored in the GRAM 231.

The CPU 240 receives a user's instruction through the operation unit 250. Furthermore, the CPU 240 issues an instruction corresponding to the received user's instruction to an appropriate component of the photographed image display device 200, or executes an operation corresponding to the received user's instruction. For example, when receiving a photographing operation executing instruction from a user, the CPU 240 instructs the ASIC 270 to perform a photographing operation. When receiving a photographing operation end instruction, the CPU 240 instructs the ASIC 270 to end the photographing operation. When receiving a photographed image storage instruction, the CPU 240 performs a photographed image data storage operation. In detail, when transfer of photographed image data from the ASIC 270 to the GRAM 231 is completed, the CPU 240 reads the photographed image data from the GRAM 231, and stores the photographed image data in the storage unit 260.

The CPU 240 judges whether the transfer of the photographed image data from the ASIC 270 to the GRAM 231 has been completed or not, with reference to a value of a flag shown by the ASIC 270. Specifically speaking, when the value of the flag is set to one, the CPU 240 judges that the transfer is occurring. When the value of the flag is set to zero, the CPU 240 judges that the transfer has been completed.

The photographing operation executing instruction is a user's instruction to display a photographed image on the LCD module 230 based on photographed image data obtained by the camera unit 210.

The photographed image storage instruction is a user's instruction to store photographed image data obtained using the camera unit 210, in the storage unit 260.

The photographing operation end instruction is a user's instruction to end the photographing operation. Here, the photographing operation indicates that a photographed image is displayed on the LCD module 230 based on photographed image data obtained by the camera unit 210.

The operation unit 250 has a key input unit (not illustrated) for receiving a user's instruction. The operation unit 250 generates an instruction signal corresponding to a key input, and outputs the generated instruction signal to the CPU 240.

The storage unit 260 stores photographed image data input by the CPU 240.

The ASIC 270 is an integrated circuit (IC) specifically designed to be used for the photographing operation. The ASIC 270 is, for example, constituted by a processor, a memory, an input/output circuit, an interface circuit, a communication circuit and the like.

The ASIC 270 controls the photographing operation. In detail, when the CPU 240 instructs the ASIC 270 to execute the photographing operation, the ASIC 270 receives photographed image data that is output from the camera unit 210, and transfers the photographed image data to the LCD module 230. When the CPU 240 instructs the ASIC 270 to end the photographing operation, the ASIC 270 ends the photographing operation.

Regarding the photographing operation, the ASIC 270 sets the value of the flag to one on reception of the output start signal from the camera unit 210. The flag indicates whether transfer of photographed image data from the ASIC 270 to the GRAM 231 is occurring. On reception of the output end signal from the camera unit 210, the ASIC 270 sets the value of the flag to zero. The value of the flag is stored in a register, which is readable from the CPU 240.

(Operation)

Figure 2:
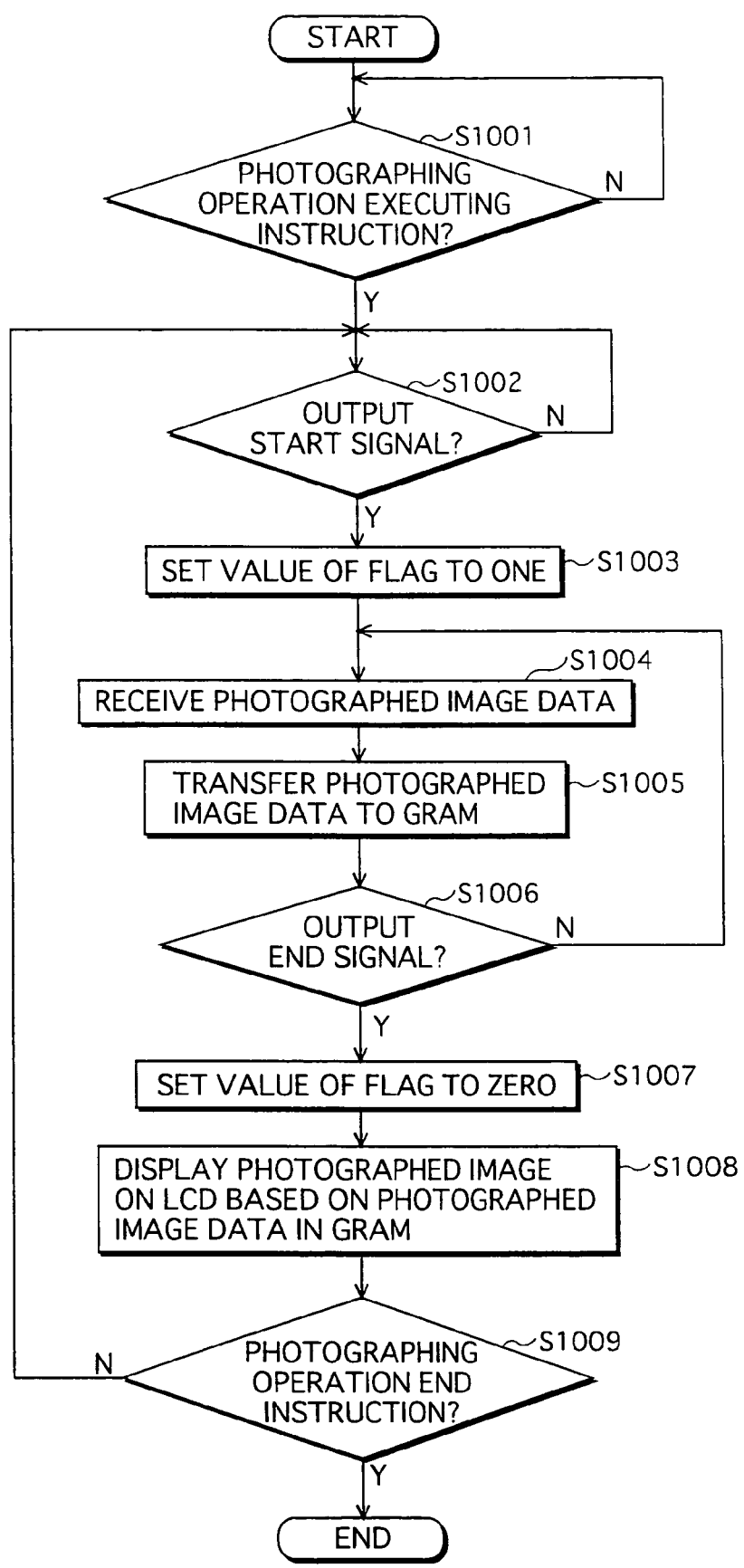
FIG. 2 is a flow chart illustrating a photographing operation performed by an ASIC 270 (shown in FIG. 1).

The following part describes the photographing operation performed by the ASIC 270, with reference to a flow chart shown in FIG. 2.

When receiving the photographing operation executing instruction from the CPU 240 (step S1001:Y), the ASIC 270 judges whether the camera unit 210 inputs the output start signal (step S1002).

If judged in the affirmative (step S1002:Y), the ASIC 270 sets the value of the flag to one (step S1003), and receives photographed image data from the camera unit 210 (step S1004). Then, the ASIC 270 transfers the photographed image data to the GRAM 231 in the LCD module 230 (step S1005), and judges whether the camera unit 210 inputs the output end signal (step S1006).

If judged in the affirmative (step S1006:Y), the ASIC 270 sets the value of the flag to zero (step S1007). The LCD 232 displays a photographed image based on the photographed image data stored in the GRAM 231 (step S1008).

If judged in the negative (step S1006:N), the ASIC 270 repeats the procedure of the steps S1004 to S1006.

When receiving the photographing operation end instruction from the CPU 240 in a step S1009 (step S1009:Y), the ASIC 270 ends the photographing operation. If not (step S1009:N), the ASIC 270 repeats the procedure of the steps S1002 to S1009.

Figure 3:
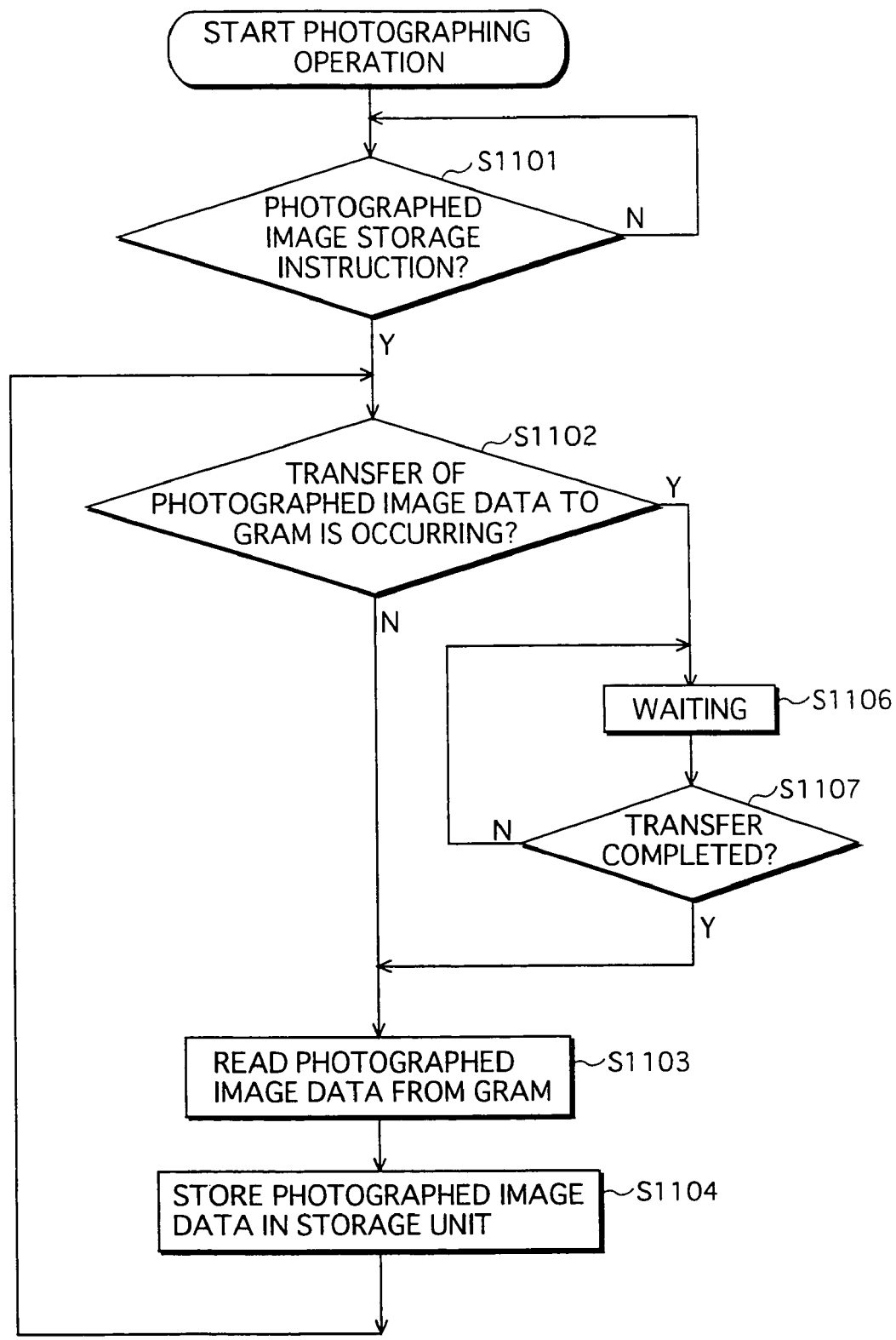
FIG. 3 is a flow chart illustrating a photographed image data storage operation performed by a CPU 240 (shown in FIG. 1).

The following part describes the photographed image data storage operation performed by the CPU 240 with reference to FIG. 3, which is a flow chart illustrating the photographed image data storage operation.

When receiving the photographed image storage instruction from the user through the operation unit 250 during the above-described photographing operation (the steps S1002 to S1008 in FIG. 2) (step S1101:Y), the CPU 240 reads the value of the flag shown by the ASIC 270. The CPU 240 then judges whether transfer of photographed image data from the ASIC 270 to the GRAM 231 in the LCD module 230 is occurring (step S1102).

If judged in the negative (step S1102:N), the CPU 240 reads photographed image data from the GRAM 231 (step S1103), and stores the photographed image data in the storage unit 260 (step S1104).

If judged in the affirmative (step 1102:Y), the CPU 240 waits until the transfer is completed (steps S1106 and S1107). When the transfer is completed, in other words, the value of the flag shown by the ASIC 270 is set to zero (step S1107:Y), the CPU 240 executes the procedure of the steps S1103 and S1104.

Second Embodiment (Construction)

Figure 4:
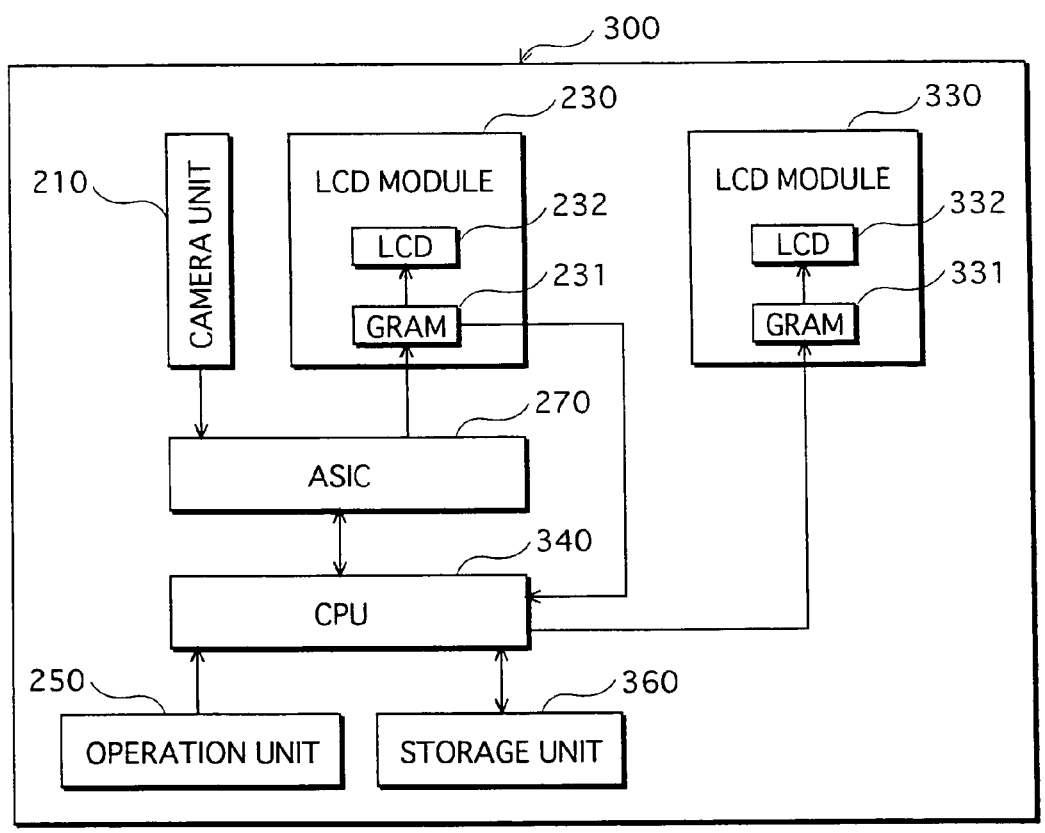
FIG. 4 is a functional block diagram illustrating a construction of a photographed image display device 300 relating to a second embodiment.

FIG. 4 illustrates a construction of a photographed image display device 300 relating to a second embodiment. The photographed image display device 300 is constituted by the camera unit 210, the LCD module 230, an LCD module 330, a CPU 340, the operation unit 250, a storage unit 360, and the ASIC 270.

The same reference numerals are applied to the components common to the photographed image display device 200 relating to the first embodiment shown in FIG. 1 and the photographed image display device 300. The following part describes the photographed image display device 300 with focus on its difference from the photographed image display device 200.

The LCD module 330 includes a GRAM 331 and an LCD 332. A composite image is displayed on the LCD 332 based on composite image data stored in the GRAM 331.

Here, "composite image data" is generated in the following manner. The CPU 340 reads and combines photographed image data stored in the GRAM 231 and frame image data stored in the storage unit 360.

In detail, after storing the photographed image data into the GRAM 331, the CPU 340 partly overwrites a memory area of the GRAM 331 which is occupied by the photographed image data, with the frame image data.

The GRAM 331 temporarily stores the composite image data.

Figure 5A:
FIG. 5 illustrates, as an example, photographed image data on which an overwriting operation is to be performed and composite image data obtained as a result of the overwriting operation.
Figure 5B:

FIG. 5A illustrates, as an example, a photographed image that is displayed based on the photographed image data on which the overwriting operation is to be performed. FIG. 5B illustrates, as an example, a composite image that is displayed based on the composite image data obtained as a result of the overwriting operation.

Figure 6C:
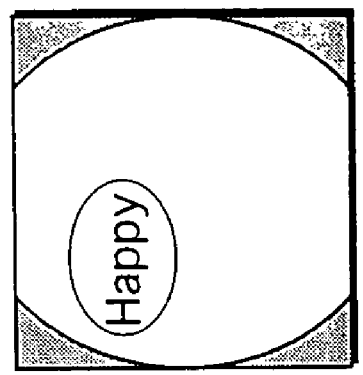
FIG. 6 illustrates, as an example, images shown by frame image data.
Figure 6B:
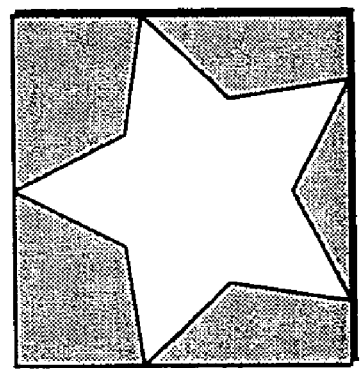
Figure 6A:
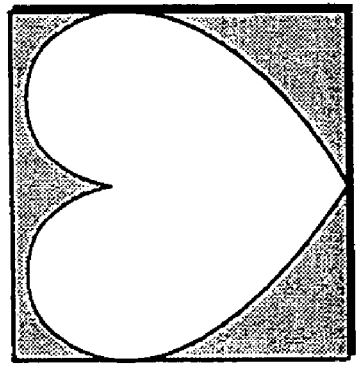

Here, the frame image data is template image data showing template images of picture frames shaped as, for example, a heart or a star. The frame image data is prestored in the storage unit 360. FIGS. 6A to 6C each illustrate, as an example, an image that is displayed based on the frame image data.

If new composite image data is input into the GRAM 331 by the CPU 340, composite image data that has been stored in the GRAM 331 is overwritten with the new composite image data.

The LCD 332 displays a composite image based on the composite image data stored in the GRAM 331.

The CPU 340 has an ability to execute a composite image display operation, in addition to the functions of the CPU 240.

This operation is specifically described in the following. The CPU 340 receives a composite image display instruction from a user through the operation unit 250. In response to the instruction, when transfer of photographed image data from the ASIC 270 to the GRAM 231 has been completed, the CPU 340 reads the photographed image data from the GRAM 231. Furthermore, the CPU 340 reads the frame image data that is prestored in the storage unit 360, and combines the photographed image data and the frame image data, to generate composite image data. The CPU 340 stores the composite image data in the GRAM 331.

The composite image display instruction is a user's instruction to display a composite image (e.g. as shown in FIG. 5B) based on a photographed image.

In addition, the CPU 340 ends the composite image display operation, when receiving a composite image display operation end instruction from the user through the operation unit 250.

Here, the composite image display operation end instruction is a user's instruction to end the composite image display operation.

When inputting the composite image display instruction, the user may specify desired frame image data by designating an identifier. In this case, the CPU 340 reads frame image data corresponding to the identifier designated by the user (for example, frame image data showing a picture frame image in FIG. 6A), from the storage unit 360, to perform the composite image display operation.

The storage unit 360 prestores one or more pieces of frame image data each of which is associated with an identifier.

(Operation)

The photographing operation performed by the ASIC 270 is described in the first embodiment, and therefore not repeatedly explained here.

Figure 7:
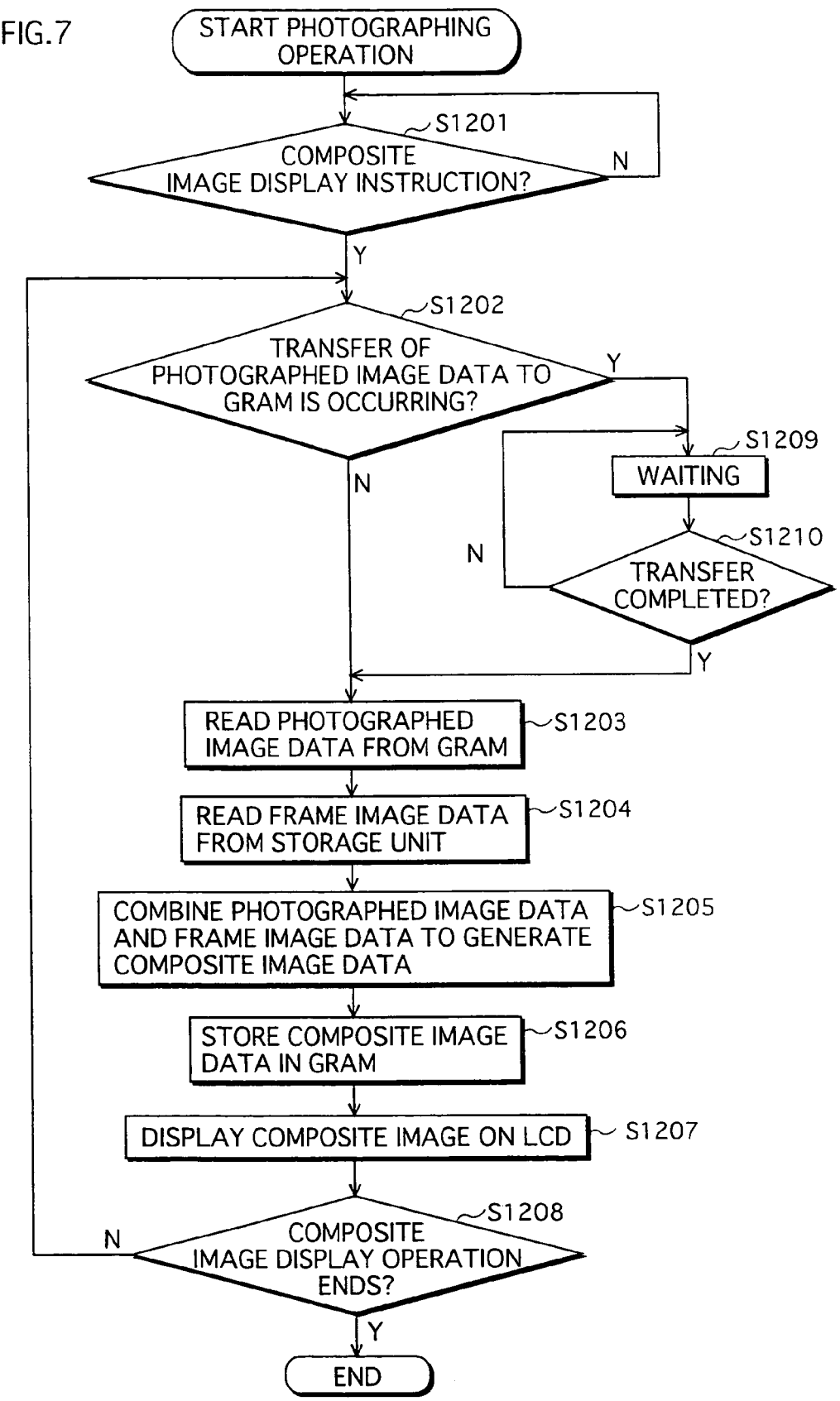
FIG. 7 is a flow chart illustrating a composite image display operation performed by a CPU 340 (shown in FIG. 4).

The following part describes the composite image display operation performed by the CPU 340 in detail, with reference to a flow chart shown in FIG. 7.

When receiving the composite image display instruction from the user through the operation unit 250 during the photographing operation (step S1201:Y), the CPU 340 reads the value of the flag shown by the ASIC 270. Thus, the CPU 340 judges whether transfer of photographed image data from the ASIC 270 to the GRAM 231 in the LCD module 230 is occurring (step S1202).

If judged in the negative (step S1202:N), the CPU 340 reads photographed image data from the GRAM 231 (step S1203), and the frame image data prestored in the storage unit 360 (step S1204). Furthermore, the CPU 340 combines the photographed image data and the frame image data, to generate composite image data (step S1205). The CPU 340 then stores the composite image data in the GRAM 331 in the LCD module 330 (step S1206). If the composite image data has been stored in the GRAM 331, the LCD 332 displays a composite image based on the composite image data stored in the GRAM 331 (step S1207).

If judged in the affirmative in the step S1202 (step S1202:Y), the CPU 340 waits until the transfer is completed (steps S1209 and S1210). When the transfer is completed, that is to say, the value of the flag shown by the ASIC 270 is set to zero (step S1210:Y), the CPU 340 performs the procedure of the steps S1203 to S1207.

If the CPU 340 receives the composite image display operation end instruction from the user through the operation unit 250 (step S1208:Y), the CPU 340 ends the composite image display operation. If not (step S1208:N), the procedure of the composite image display operation goes back to the step S1202.

It should be noted that the present invention is not limited to the first and second embodiments described above.

For instance, the photographed image display devices 200 and 300 respectively relating to the first and second embodiments of the present invention may be mounted with mobile telephones, digital cameras, camcorders, mobile communications terminals such as PDAs, and other electronic devices.

Figure 10:
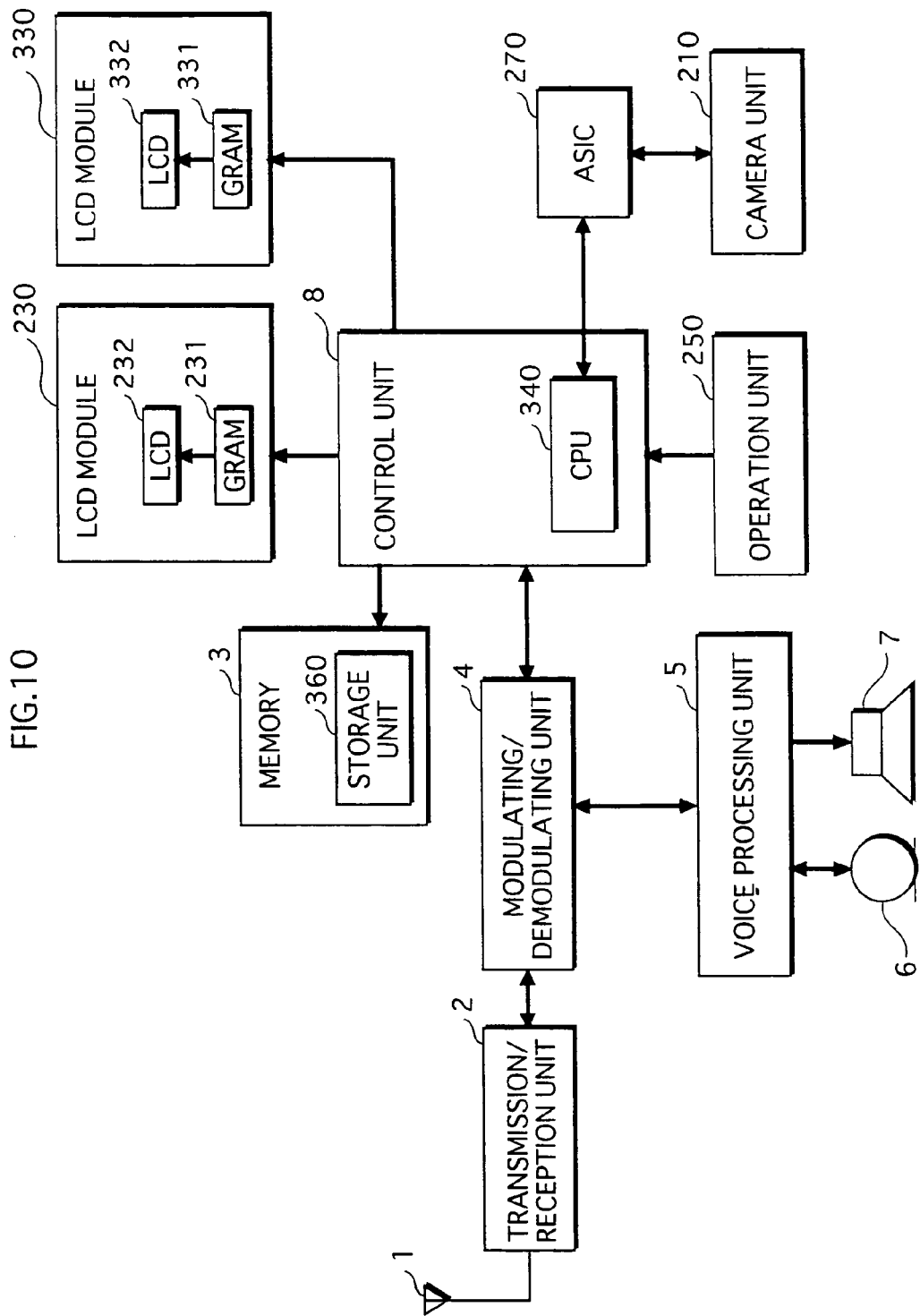
FIG. 10 is a functional block diagram illustrating, as an example, a mobile telephone including the photographed image display device 300 relating to the second embodiment.

FIG. 10 is a functional block diagram illustrating a mobile telephone which is mounted with the photographed image display device 300 relating to the second embodiment. The mobile telephone shown in FIG. 10 can be modified. For example, the CPU 340 and the storage unit 360 may be replaced with the CPU 240 and the storage unit 260 respectively, and the LCD module 330 may be excluded.

The mobile telephone shown in FIG. 10 is constituted by an antenna 1, a transmission/reception unit 2, a memory 3, a modulating/demodulating unit 4, a voice processing unit 5, a microphone 6, a receiver 7, a control unit 8, and the photographed image display device 300. The antenna 1 transmits and receives radio waves for communication. The transmission/reception unit 2 transmits and receives data communicated via radio waves. The memory 3 includes the storage unit 360. The modulating/demodulating unit 4 modulates and demodulates communication data. The voice processing unit 5 digital-to-analog converts communication data output from the modulating/demodulating unit 4 to generate sound signals, and outputs the sound signals to the receiver 7. The voice processing unit 5 also converts sounds output from the microphone 6 into sound signals, and outputs the sound signals to the modulating/demodulating unit 4 as communication data to be transmitted. The control unit 8 includes a microprocessor, a Read Only Memory (ROM) and the like. The control unit 8 executes a control program stored in the ROM, to control the entire mobile telephone.

Figure 8:
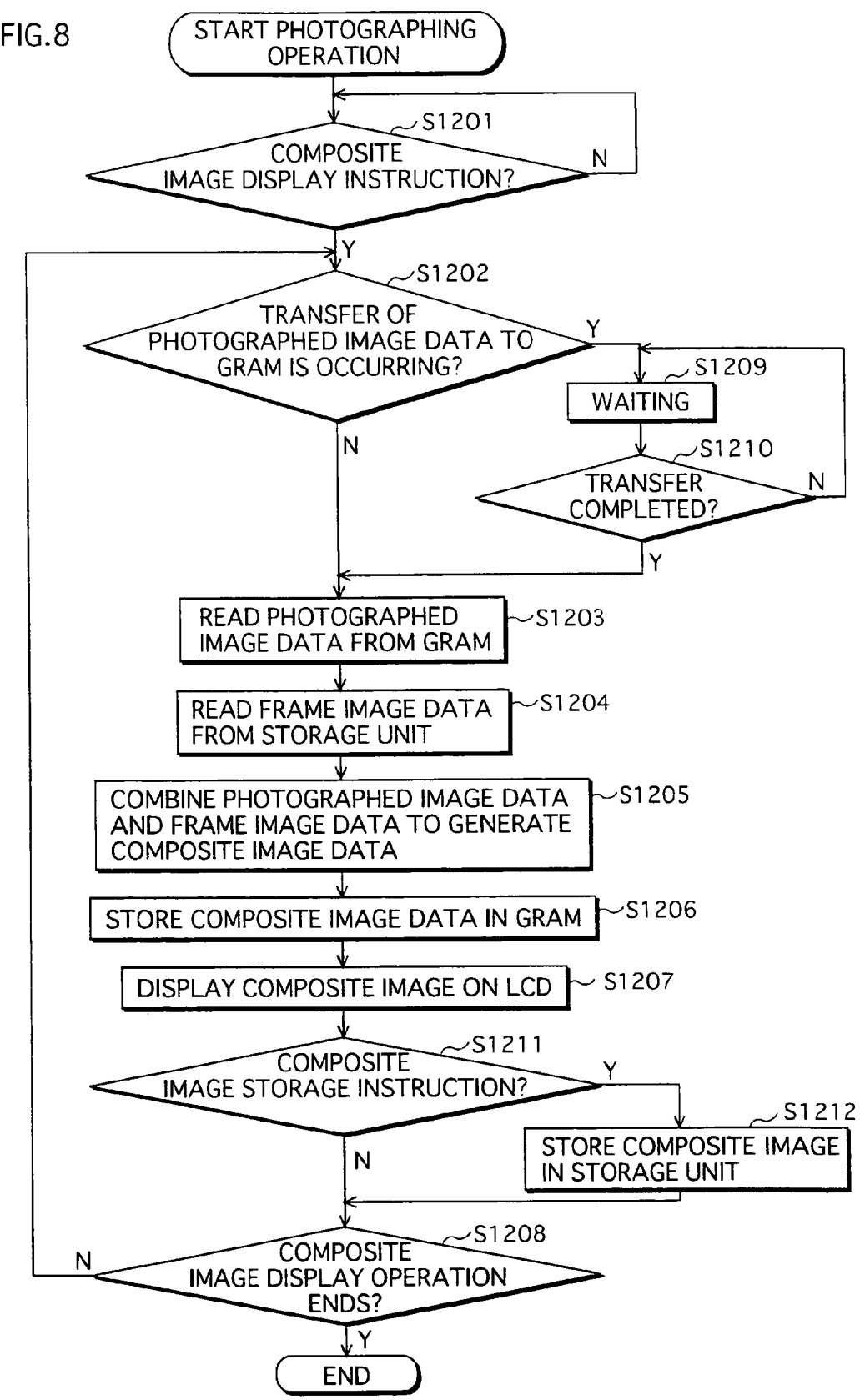
FIG. 8 is a flow chart illustrating the composite image display operation performed by the CPU 340, when a composite image storage operation is included.
Figure 9:
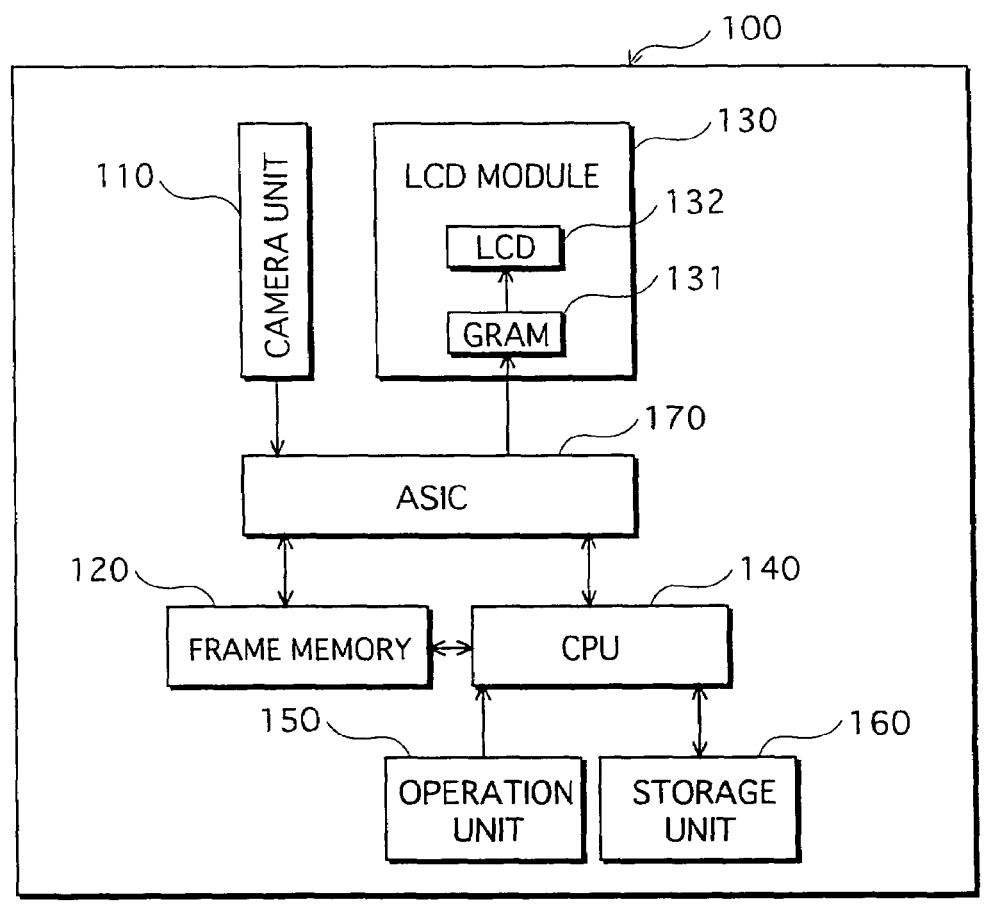
FIG. 9 is a functional block diagram illustrating an example construction of a conventional photographed image display device 100.

According to the second embodiment, the composite image data is displayed on the LCD 332. In addition, when receiving a composite image storage instruction to store the composite image data from the user through the operation unit 250, the CPU 340 may store the composite image data in the storage unit 360. FIG. 8 is a flow chart illustrating the composite image display operation including the above-mentioned composite image storage operation performed by the CPU 340.

According to the flowchart shown in FIG. 8, when receiving the composite image storage instruction from the user through the operation unit 250 (step S1211:Y), the CPU 340 reads composite image data from the GRAM 331, and stores the composite image data into the storage unit 360 (step S1212). The rest of the steps of the flowchart in FIG. 8 are the same as the corresponding steps of the flow chart in FIG. 7, and therefore not repeatedly explained here.

Regarding the second embodiment, while the composite image data is displayed on the LCD 332, the CPU 340 may prohibit display of photographed image data on the LCD 232. Specifically speaking, when receiving the composite image display instruction in the step S1201 in FIG. 7 or 8 (step S1201:Y), the CPU 340 may turn the LCD 232 off. In this case, when receiving the composite image display operation end instruction in the step S1208 (step S1208:Y), the CPU 340 may turn the LCD 232 back on.

This construction can save power consumption of the photographed image display device 300.

INDUSTRIAL APPLICABILITY

A photographed image display device and a photographed image display method according to the present invention can contribute to miniaturize a mobile communications terminal with a photographing function and to reduce a manufacturing cost of such a terminal.

The invention claimed is:

1. A photographed image display device comprising:
a first LCD module and a second LCD module which each include an LCD and a graphic memory dedicated to storing image data to be displayed on the LCD;
a photographing unit operable to form an optical image of an object, convert the formed optical image into image data, and output the image data sequentially;
a first transfer unit operable to receive the image data output from the photographing unit, and transfer the image data directly to the graphic memory in the first LCD module, as image data to be displayed on the LCD in the first LCD module;
a storage medium prestoring frame image data;
a judging unit operable to judge whether the transfer of the image data from the first transfer unit to the graphic memory in the first LCD module has been completed; and
a second transfer unit operable to, when the transfer has been completed, read the image data to be displayed directly from the graphic memory in the first LCD module, combine the read image data to be displayed and the frame image data so as to generate composite image data, and transfer the composite image data directly to the graphic memory in the second LCD module, as image data to be displayed on the LCD in the second LCD module.

2. The photographed image display device of claim 1, further comprising:
a storage instruction receiving unit operable to receive a storage instruction to store the composite image data into the storage medium; and
a storing unit operable to store the composite image data into the storage medium according to the storage instruction.

3. The photographed image display device of claim 1, wherein
the first LCD module reads, from the graphic memory thereof, the image data to be displayed which has been transferred by the first transfer unit, and displays only a pre-composite image represented by the image data to be displayed, and
the second LCD module reads, from the graphic memory thereof, the composite image data transferred by the second transfer unit, and displays a composite image represented by the composite image data.

4. The photographed image display device of claim 3, further comprising:
an instruction receiving unit operable to receive an instruction of performing a display of the composite image and an instruction of ending the display; and
a display control unit operable to, (i) when the instruction of performing a display of the composite image is received, place an inhibition on the first LCD module from displaying the pre-composite image, and (ii) when the instruction of ending the display is received, cancel the inhibition.

5. A photographed image display method for a photographed image display device including (i) a first LCD module and a second LCD module each including an LCD and a graphic memory dedicated to temporarily storing image data to be displayed on the LCD, and (ii) a storage medium prestoring frame image data, the photographed image display method comprising:
a photographing step of forming an optical image of an object, converting the formed optical image into image data, and outputting the image data sequentially;
a first transfer step of receiving the image data output in the photographing step, and transferring the image data directly to the graphic memory in the first LCD module, as image data to be displayed on the LCD in the first LCD module;
a judging step of judging whether the transfer of the image data to the graphic memory in the first LCD module has been completed; and
a second transfer step of, when the transfer has been completed, reading the image data to be displayed directly from the graphic memory in the first LCD module, combining the read image data to be displayed and the frame image data so as to generate composite image data, and transferring the composite image data directly to the graphic memory in the second LCD module, as image data to be displayed on the LCD in the second LCD module.

6. A mobile telephone including a photographed image display device, the photographed image display device comprising:
a first LCD module and a second LCD module which each include an LCD and a graphic memory dedicated to storing image data to be displayed on the LCD;
a photographing unit operable to form an optical image of an object, convert the formed optical image into image data, and output the image data sequentially;
a first transfer unit operable to receive the image data output from the photographing unit and transfer the image data directly to the graphic memory in the first LCD module, as image data to be displayed on the LCD in the first LCD module;
a storage medium prestoring frame image data;
a judging unit operable to judge whether the transfer of the image data from the first transfer unit to the graphic memory in the first LCD module has been completed; and
a second transfer unit operable to, when the transfer has been completed, read the image data to be displayed directly from the graphic memory in the first LCD module, combine the read image data to be displayed and the frame image data so as to generate composite image data, and transfer the composite image data directly to the graphic memory in the second LCD module, as image data to be displayed on the LCD in the second LCD module.

7. The mobile telephone of claim 6, wherein
the first LCD module reads, from the graphic memory thereof, the image data to be displayed which has been transferred by the first transfer unit, and displays only a pre-composite image represented by the image data to be displayed, and
the second LCD module reads, from the graphic memory thereof, the composite image data transferred by the second transfer unit and displays a composite image represented by the composite image data.

8. The mobile telephone of claim 6, further comprising:
an instruction receiving unit operable to receive an instruction of performing a display of the composite image and an instruction of ending the display; and
a display control unit operable to, (i) when the instruction of performing a display of the composite image is received, place an inhibition on the first LCD module from displaying the pre-composite image, and (ii) when the instruction of ending the display is received, cancel the inhibition.

9. A photographed image display device comprising:
a first LCD module and a second LCD module which each include a graphic memory operable to store image data and an LCD operable to display an image based on the image data stored in the graphic memory;
a photographing unit operable to form an optical image of an object, convert the formed optical image into image data, and output the image data sequentially;
a first transfer unit operable to receive the image data output from the photographing unit and transfer the image data to the graphic memory in the first LCD module;
a storage medium prestoring frame image data;
a judging unit operable to judge whether the transfer of the image data from the first transfer unit to the graphic memory in the first LCD module has been completed; and
a second transfer unit operable to, when the transfer has been completed, read the image data from the graphic memory in the first LCD module, combine the read image data and the frame image data so as to generate composite image data, and transfer the composite image data to the graphic memory in the second LCD module, wherein
the first LCD module reads, from the graphic memory thereof, the image data transferred by the first transfer unit, and displays a pre-composite image based on the image data,
the second LCD module reads, from the graphic memory thereof, the composite image data transferred by the second transfer unit, and displays a composite image based on the composite image data, wherein
the storage medium prestores a plurality of types of frame image data, and the photographed image display device further comprising:
a specification receiving unit operable to receive a specification of a type of frame image data to be combined, wherein
the second transfer unit combines the read image data and the frame image data of the specified type, and transfers the composite image data to the graphic memory in the second LCD module.

10. A mobile telephone including a photographed image display device, the photographed image display device comprising:
a first LCD module and a second LCD module which each include a graphic memory operable to store image data and an LCD operable to display an image based on the image data stored in the graphic memory;
a photographing unit operable to form an optical image of an object, convert the formed optical image into image data, and output the image data sequentially;
a first transfer unit operable to receive the image data output from the photographing unit and transfer the image data to the graphic memory in the first LCD module;
a storage medium prestoring frame image data;
a judging unit operable to judge whether the transfer of the image data from the first transfer unit to the graphic memory in the first LCD module has been completed; and
a second transfer unit operable to, when the transfer has been completed, read the image data from the graphic memory in the first LCD module, combine the read image data and the frame image data so as to generate composite image data, and transfer the composite image data to the graphic memory in the second LCD module, wherein
the storage medium prestores a plurality of types of frame image data, and the photographed image display device further comprising:
a specification receiving unit operable to receive a specification of a type of frame image data to be combined, wherein
the second transfer unit combines the read image data and the frame image data of the specified type, and transfers the composite image data to the graphic memory in the second LCD module.

11. A photographed image display device consisting of:
a first LCD module and a second LCD module which each include an LCD and a graphic memory dedicated to storing image data to be displayed on the LCD;
a photographing unit operable to form an optical image of an object, convert the formed optical image into image data, and output the image data sequentially;
a first transfer unit operable to receive the image data output from the photographing unit, and transfer the image data directly to the graphic memory in the first LCD module, as image data to be displayed on the LCD in the first LCD module;
a storage medium prestoring frame image data;
a judging unit operable to judge whether the transfer of the image data from the first transfer unit to the graphic memory in the first LCD module has been completed; and
a second transfer unit operable to, when the transfer has been completed, read the image data to be displayed directly from the graphic memory in the first LCD module, combine the read image data to be displayed and the frame image data so as to generate composite image data, and transfer the composite image data directly to the graphic memory in the second LCD module, as image data to be displayed on the LCD in the second LCD module.

12. A mobile telephone including a photographed image display device, the photographed image display device consisting of:
a first LCD module and a second LCD module which each include an LCD and a graphic memory dedicated to storing image data to be displayed on the LCD;
a photographing unit operable to form an optical image of an object, convert the formed optical image into image data, and output the image data sequentially;
a first transfer unit operable to receive the image data output from the photographing unit and transfer the image data directly to the graphic memory in the first LCD module, as image data to be displayed on the LCD in the first LCD module;
a storage medium prestoring frame image data;
a judging unit operable to judge whether the transfer of the image data from the first transfer unit to the graphic memory in the first LCD module has been completed;

and a second transfer unit operable to, when the transfer has been completed, read the image data to be displayed directly from the graphic memory in the first LCD module, combine the read image data to be displayed and the frame image data so as to generate composite image data, and transfer the composite image data directly to the graphic memory in the second LCD module, as image data to be displayed on the LCD in the second LCD module.

* * * * *